(12) United States Patent
Innes

(10) Patent No.: US 11,413,666 B1
(45) Date of Patent: Aug. 16, 2022

(54) VERTICAL TRAVEL ROBOTIC TANK CLEANING SYSTEM

(71) Applicant: AGI Engineering, Inc., Stockton, CA (US)

(72) Inventor: Alex G. Innes, Lodi, CA (US)

(73) Assignee: AGI Engineering, Inc., Stockton, CA (US)

(*) Notice: Subject to any disclaimer, the term of this patent is extended or adjusted under 35 U.S.C. 154(b) by 191 days.

(21) Appl. No.: 16/231,541

(22) Filed: Dec. 23, 2018

Related U.S. Application Data

(60) Provisional application No. 62/630,000, filed on Feb. 13, 2018.

(51) Int. Cl.
*B08B 9/093* (2006.01)
*B05B 3/12* (2006.01)
(Continued)

(52) U.S. Cl.
CPC .......... *B08B 9/0813* (2013.01); *B08B 9/0808* (2013.01); *B25J 9/06* (2013.01);
(Continued)

(58) Field of Classification Search
CPC ......... B08B 9/93; B08B 9/0933; B08B 9/087; B08B 9/0813; B08B 9/0808; B08B 13/00;
(Continued)

(56) References Cited

U.S. PATENT DOCUMENTS

| | | |
|---|---|---|
| 1,611,326 A | 12/1926 | Abbe |
| 2,461,433 A | 2/1949 | Moulten et al. |

(Continued)

FOREIGN PATENT DOCUMENTS

| | | |
|---|---|---|
| EP | 1166903 | 1/2002 |
| EP | 3151246 A1 | 4/2017 |

(Continued)

OTHER PUBLICATIONS

Electro-Coatings (https://www.electro-coatings.com/corrosion-resistant-coatings.php) (Year: 2016).*

(Continued)

*Primary Examiner* — Michael E Barr
*Assistant Examiner* — Irina Graf
(74) *Attorney, Agent, or Firm* — Brian S. Steinberger; Hilary F. Steinberger; Law Offices of Brian S. Steinberger, P.A.

(57) ABSTRACT

Systems, devices, and methods for passing vertical travel robotic tank cleaning systems through openings while mounted to existing riser structures, the system can extend to the bottom of the tank and horizontally more than approximately 30 feet. Plural systems can be used within a tank to break down solid sludge by placing high-pressure nozzle(s) in close proximity to solid waste providing maximum coverage. A mechanical arm with a nozzle assembly utilizes high- and low-pressure fluid streams to fluidize and liquefy solids while directly moving them to a centrally located transfer pump. The systems work in highly radioactive, chemically aggressive, explosive, high temperature and low temperature environments through hydraulic actuation. Multiple axis of freedom allows the arm and nozzle assembly to navigate and clean around internal obstacles and reach close proximity for maximum nozzle impingement force. Systems can be remotely operated up to approximately 1000 feet away.

20 Claims, 20 Drawing Sheets

(51) Int. Cl.
  *B05B 15/72* (2018.01)
  *B25J 9/06* (2006.01)
  *B08B 9/08* (2006.01)
  *B25J 9/10* (2006.01)
  *B25J 18/02* (2006.01)
  *G21F 9/22* (2006.01)

(52) U.S. Cl.
  CPC ............ *B25J 9/104* (2013.01); *B25J 18/025* (2013.01); *G21F 9/22* (2013.01)

(58) Field of Classification Search
  CPC .. B25J 9/06; B25J 9/104; B25J 18/025; G21F 9/22
  See application file for complete search history.

(56) References Cited

U.S. PATENT DOCUMENTS

| | | |
|---|---|---|
| 2,611,523 A | 9/1952 | Aines |
| 2,668,625 A | 2/1954 | Garland |
| 2,669,941 A | 2/1954 | Stafford |
| 2,682,886 A | 7/1954 | Paxton |
| 2,761,297 A | 9/1956 | Buchsteiner |
| 2,819,803 A | 1/1958 | Obenchain |
| 2,833,422 A | 5/1958 | Ferwerda et al. |
| 2,985,192 A | 5/1961 | Taylor et al. |
| 2,999,600 A | 9/1961 | Gates |
| 3,060,972 A | 10/1962 | Sheldon |
| 3,095,044 A | 6/1963 | Medlock |
| 3,116,021 A | 12/1963 | Born |
| 3,155,048 A | 11/1964 | Mandelbaum et al. |
| 3,161,490 A | 12/1964 | Dudek |
| 3,162,214 A | 12/1964 | Bazinet, Jr. |
| 3,190,286 A | 6/1965 | Stokes |
| 3,266,059 A | 8/1966 | Stelle |
| 3,274,850 A | 9/1966 | Tascio |
| 3,305,220 A | 2/1967 | Nevulis |
| 3,469,712 A | 9/1969 | Haulotte |
| 3,497,083 A | 2/1970 | Anderson et al. |
| 3,580,099 A | 5/1971 | Mosher |
| 3,599,871 A | 8/1971 | Ruppel |
| 3,757,697 A | 9/1973 | Phinney |
| 3,788,338 A | 1/1974 | Burns |
| 3,845,596 A | 11/1974 | Veenstra |
| 3,863,844 A | 2/1975 | McMillan |
| 3,889,818 A | 6/1975 | Wennerstrom |
| 3,932,065 A | 1/1976 | Ginsberg et al. |
| 3,951,572 A | 4/1976 | Ray, Jr. et al. |
| 4,106,671 A | 8/1978 | Sharples |
| 4,132,041 A | 1/1979 | Van Den Broek |
| 4,156,331 A | 5/1979 | Lester et al. |
| 4,220,170 A * | 9/1980 | Hebert .................... B63B 57/02 134/167 R |
| 4,250,933 A | 2/1981 | Olson |
| 4,339,232 A | 7/1982 | Campbell |
| 4,393,728 A | 7/1983 | Larson et al. |
| 4,396,093 A | 8/1983 | Zimmerman |
| 4,415,297 A | 11/1983 | Boring |
| 4,494,417 A | 1/1985 | Larson et al. |
| 4,540,869 A | 9/1985 | Yasuoka |
| 4,630,741 A | 12/1986 | Stevens |
| 4,661,039 A | 4/1987 | Brenholt |
| 4,685,349 A | 8/1987 | Wada et al. |
| 4,817,653 A | 4/1989 | Krajicek et al. |
| 4,828,461 A | 5/1989 | Laempe |
| 4,848,179 A | 7/1989 | Ubhayakar |
| 4,944,535 A | 7/1990 | Maupin |
| 4,945,955 A | 8/1990 | Murphy |
| 4,977,790 A | 12/1990 | Nishi et al. |
| 5,007,803 A | 4/1991 | Divito et al. |
| D326,336 S | 5/1992 | Christ |
| 5,172,710 A | 12/1992 | Harrington |
| 5,174,168 A | 12/1992 | Takagi et al. |
| 5,297,443 A | 3/1994 | Wentz |
| 5,439,020 A | 8/1995 | Lockhart |
| 5,515,654 A | 5/1996 | Anderson |
| 5,518,553 A | 5/1996 | Moulder |
| 5,540,172 A | 7/1996 | Goldbach et al. |
| 5,607,000 A | 3/1997 | Cripe et al. |
| 5,715,852 A | 2/1998 | Jepsen |
| 5,740,821 A | 4/1998 | Arnold |
| 5,913,320 A | 6/1999 | Varrin, Jr. et al. |
| 6,213,135 B1 | 4/2001 | Moulder |
| 6,264,434 B1 | 7/2001 | Frank |
| 6,273,790 B1 | 8/2001 | Neese et al. |
| 6,280,408 B1 | 8/2001 | Sipin |
| 6,285,919 B1 * | 9/2001 | Randolph ................ B08B 9/08 700/245 |
| 6,499,612 B1 * | 12/2002 | Harrgington .......... B66C 23/701 212/270 |
| 6,561,368 B1 | 5/2003 | Sturm, Jr. et al. |
| 6,651,837 B2 | 11/2003 | Stradinger et al. |
| 6,830,079 B1 | 12/2004 | Ahrens et al. |
| 6,889,920 B2 | 5/2005 | Nance et al. |
| 6,938,691 B2 | 9/2005 | Face |
| 7,021,675 B2 | 4/2006 | Lawson |
| 7,032,628 B2 | 4/2006 | Guillemette et al. |
| 7,100,631 B2 | 9/2006 | Liu et al. |
| 7,241,080 B2 | 7/2007 | Klobucar et al. |
| 7,708,504 B2 | 5/2010 | Heckendorn et al. |
| 7,998,251 B2 | 8/2011 | Pondelick et al. |
| 8,069,747 B2 | 12/2011 | Buckingham et al. |
| 8,205,522 B2 | 6/2012 | Buckingham et al. |
| 8,347,563 B2 | 1/2013 | Anderson |
| 8,414,246 B2 | 4/2013 | Tobey |
| 8,702,399 B2 | 4/2014 | Krohn |
| 8,727,671 B2 | 5/2014 | Sundholm |
| 8,763,855 B1 | 7/2014 | Harvey et al. |
| 8,840,087 B2 | 9/2014 | Guyard |
| 9,195,238 B2 | 11/2015 | Roden et al. |
| 10,280,063 B2 | 5/2019 | Innes et al. |
| 10,406,571 B2 | 9/2019 | Innes et al. |
| 2002/0002426 A1 | 1/2002 | Burkhard |
| 2005/0025573 A1 | 2/2005 | Waldman et al. |
| 2005/0098196 A1 * | 5/2005 | Hebert .................... B08B 9/093 134/22.18 |
| 2005/0109376 A1 | 5/2005 | Gregory |
| 2005/0166413 A1 | 8/2005 | Crampton |
| 2006/0054189 A1 | 3/2006 | Luke et al. |
| 2006/0054202 A1 | 3/2006 | Luke et al. |
| 2007/0150101 A1 * | 6/2007 | Laski .................... B25J 9/0018 700/245 |
| 2008/0099414 A1 * | 5/2008 | Haslem .................. B67D 7/061 210/800 |
| 2008/0148876 A1 | 6/2008 | Hock et al. |
| 2010/0221125 A1 | 9/2010 | Fulkerson et al. |
| 2010/0234988 A1 | 9/2010 | Buckingham et al. |
| 2010/0264013 A1 | 10/2010 | Burton |
| 2011/0186657 A1 | 8/2011 | Haviland |
| 2011/0315165 A1 | 12/2011 | McWhorter |
| 2012/0106882 A1 | 5/2012 | Ponnouradjou et al. |
| 2012/0279537 A1 | 11/2012 | Peeters et al. |
| 2014/0079573 A1 | 3/2014 | Pabst |
| 2015/0034176 A1 | 2/2015 | Arguelles et al. |
| 2015/0068012 A1 * | 3/2015 | McClister .............. B62D 65/00 29/428 |
| 2015/0124242 A1 | 5/2015 | Pierce et al. |
| 2015/0217305 A1 * | 8/2015 | Yie .......................... B08B 3/02 239/240 |
| 2015/0362000 A1 | 12/2015 | Schmidt et al. |
| 2016/0055268 A1 | 2/2016 | Bell et al. |
| 2016/0107207 A1 | 4/2016 | Desormeaux |
| 2017/0173617 A1 | 6/2017 | Zilai et al. |
| 2017/0259309 A1 | 9/2017 | Innes et al. |
| 2017/0326737 A1 * | 11/2017 | Martin .................... B25J 9/045 |

FOREIGN PATENT DOCUMENTS

| | | |
|---|---|---|
| IN | 201741036558 | 4/2017 |
| JP | 2000111296 A * | 4/2000 |
| JP | 2004301665 A | 10/2004 |

(56) References Cited

FOREIGN PATENT DOCUMENTS

| WO | 2009018599 | 2/2009 |
|---|---|---|
| WO | 2014019852 A1 | 2/2014 |

OTHER PUBLICATIONS https://pressurewashr.com/pressure-washer-nozzles-101/ (Year: 2017).*
OCEANEERING International, Inc., PCT Patent Application No. PCT/US18/060093, filed Nov. 9, 2018, Notification of Transmittal of the International Search Report and The Written Opinion of the International Searching Authority, or the Declaration dated Feb. 5, 2019, 3 pages.
Innes, Alex. G., PCT Patent Application No. PCT/US/19/036567, filed Jun. 11, 2019, Notification of Transmittal of the International Search Report and the Written Opinion of the International Search Authority, or the Declaration dated Sep. 17, 2019, 8 pages.
Lane, et al. "FY10 Engineering Innovations, Research and Technology Report" In: Lawrence Livermore National Lab. Jan. 31, 2011 (Jan. 31, 2011) retrieved on Aug. 10, 2019 (Aug. 10, 2019) from https://e-reports-ext.llnl.gov/pdf/461932.pdf, 99 pages.
Bullseye Pumps, Bullseye B200-SPDK Vacuum Loading Solids Pump, 2017, retrieved from http://www.bullseyepumps.com/products/bullseye-b200-spdk-vacuum-loading-solids-pump?variant=31478670788, 10 pages.
Sykes Pumps, General Purpose, GP50 Pump Performance, 2017, retrieved from http://www.sykespumps.com.sa/pumps/product-specs/gp_50_75.html, 2 pages.
Pentair Southern Cross, SX60 Portable Slurry Pump, 2017, retrieved from http://www.southerncross.pentair.com.au/product/market/pumps/vacuum-pumps/sx60-portable-slurry-pump/, 3 pages.
Wastecorp. Pumps, Super Duty, TVP-65 Series Vacuum Pumps, 2017, brochure, 1 page.
RITCHIESpecs, Gradall 534D-9-45 Telescopic Forklift, 2017, retrieved from www.ritchiespecs.com, 2 pages.
Boom, Gradall Material Handler 534 D-6/534 D-6 Turbo, Jul. 2002, 1 page.
Manitowoc, National Crane 600H Series Product Guide, 2012, 16 pages.
Manitowoc, National Crane 680H-TM, Aug. 2015, 4 pages.
Festo, Bionic Handling Assistant, Apr. 2012, 6 pages.
Schuiz, Maxon Motor, Robotic Snake-Arm Flies into Tight Spaces, 2012, 4 pages.
McMahan, W., et al., Field Trials and Testing of the OctArm Continuum Manipulator, IEEE, May 2006, pp. 2336-2341, 6 pages.
Li, Z., et al., A Novel Tele-Operated Flexible Robot Targeted for Minimally Invasive Robotic Surgery, Engineering Research Robotics Article, Mar. 2015, pp. 073-078, vol. 1, issue 1, 6 pages.
Li, Z., et al., Kinematic Comparison of Surgical Tendon-Driven Manipulators and Concentric Tube Manipulators, Mechanism and Machine Theory, 2017, pp. 148-165, vol. 107, 18 pages.
Military Elevation Solutions and Tactical Trailers, KVL and KVR Telescopic Cable-Drive Masts, Sep. 2016, 3 pages.
OCRobotics, Laser Snake 2, Snake-arm robot and high-power laser integration, www.ocrobotics.com, 2016, 4 pages.
OCRobotics, Nuclear decommissioning case-study: Laser Snake, Snake-arm robot and high-power laser integration, www.ocrobotics.com, 2016, 4 pages.
Bauer, et al., Development and Deployment of the Extended Reach Sluicing System (ERSS) for Retrieval of Hanford Single Shell Tank Waste—14206 (Draft), U.S. Department of Energy, Assistant Secretary for Environmental Management, Washington River Protection Solutions, Nov. 2013, 19 pages.
Innes, PCT Patent Application No. PCT/US17/18120 filed Feb. 16, 2017, Notification of Transmittal of the International Search Report and the Written Opinion of the International Searching Authority, or the Declaration dated May 10, 2017, 14 pages.
Innes, PCT Patent Application No. PCT/US17/18120 filed Feb. 16, 2017, Notification Concerning Transmittal of International Preliminary Report on Patentability, 12 pages.
Pearson, M.J., et al., "Biomimetic Vibrissal Sensing for Robots," Philosophical Transactions of the Royal Society B (2011), vol. 366, pp. 3085-3096, 12 pages.
Innes, Alex. G., PCT Patent Application No. PCT/US/19/068359, filed Dec. 23, 2019, Notification of Transmittal of the International Search Report and the Written Opinion of the International Search Authority, or the Declaration dated Feb. 25, 2020, 14 pages.
Jetter Depot, Nozzles, Hoses, Parts, Accessories, New & Used Jetters, Ridgid Cameras, product catalog, Spring 2016 31 pages, Cumming, GA, US.
Kamat, Orbital Nozzles (2008/2011), Spare Parts for Orbital Nozzle (2011), Nozzle Selection Table (2008), 4 pages, Witten, Deutschland.
Potter Roemer, Fire Protection Equipment, Monitor/Nozzle Catalog, Fire Pro Division, 2015, 32 pages, Industry, CA, US.
UNIFIRE, Force 50 Robotic Nozzle Catalog, 2015, 46 pages.

* cited by examiner

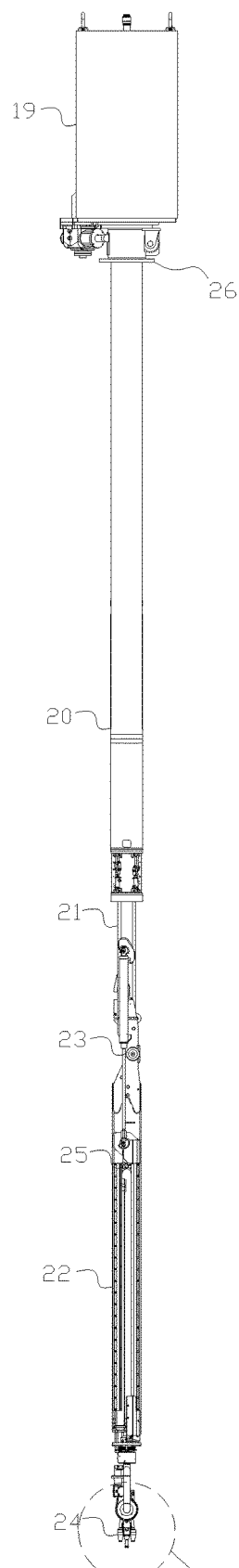
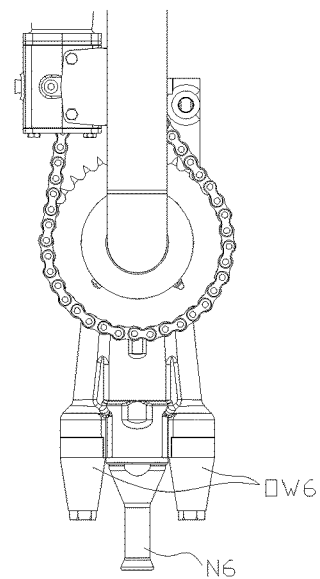
FIG. 5A
FIG. 5F

VERTICAL TRAVEL ROBOTIC TANK CLEANING SYSTEM

This application claims the benefit of priority to U.S. Provisional Patent Application Ser. No. 62/630,00 filed Feb. 13, 2018, which is incorporated by reference in its' entirety.

FIELD OF INVENTION

This application relates to cleaning of nuclear waste storage tanks containing radioactive liquids, solids, and sludge waste, where these tanks, approaching approximately 100 feet in diameter, have only an approximately 12-inch diameter opening to pass through, and in particular to systems, devices, and methods for passing vertical reach robotic tank cleaning systems and devices through the opening and mounted to existing riser structure. The robotic vertical reach tank cleaning systems and devices can extend to the bottom of the tank and horizontally more than 30 feet. The systems and devices are light weight and can be supported by the existing structure of the tank. Two or more of these systems and devices can be used within a single tank to break down the solid sludge by placing the high-pressure nozzle in close proximity to the solid waste and providing maximum coverage. A mechanical arm with a nozzle assembly utilizes high- and low-pressure fluid streams to fluidize solids while directly motivating them in the direction of a centrally located transfer pump. The robotic vertical reach tank cleaning systems, devices and methods can work using hydraulic actuation in highly radioactive, chemically aggressive, explosive, environments with high temperature conditions up to approximately 212 degrees Fahrenheit, or low temperature conditions down to approximately 32 degrees Fahrenheit.

Multiple axis of freedom allows the arm and nozzle assembly to navigate and clean around internal tank obstacles and reach close proximity for maximum nozzle impingement force. The robotic vertical reach tank cleaning systems, devices and methods can be remotely operated up to 1000 feet away. The various capabilities of this invention alleviate the difficulties of access to nuclear storage tanks with greater depths of solid waste.

BACKGROUND AND PRIOR ART

At nuclear waste storage facilities, radioactive material is generally stored in underground tanks. Historically, cleaning of the underground tanks has typically been done in conical bottom tanks that allow liquid to drain towards a centrally located transfer pump. With flat bottom tanks, the liquid is not pulled by gravity towards the tank center. As such, it is more difficult to direct flow to the pump; and areas behind obstructions can become difficult to clean efficiently or effectively.

A vertical reach cleaning system can position the nozzle(s) such that the water jet directs the liquefied waste towards the transfer pump. However, waste depth in some tanks can be too high to allow a long arm cleaning system of adequate length to be installed.

Short arm cleaning systems have been considered, but this limits the high-pressure nozzle proximity to the waste during the majority of the cleaning of the tank, thus, reduces impingement force and the range of the cleaning system, and limits the capability to clean obstructed areas.

The present invention seeks to provide a solution that solves the above challenges and provides functional cleaning capabilities in tanks with large waste build up and obstructions.

SUMMARY OF THE INVENTION

A primary objective of the present invention is to provide systems, devices and methods of providing a vertically adjustable robotic tank cleaning system for use in nuclear waste storage tanks.

A vertical travel robotic tank cleaning system can be mounted to existing pipe tank risers as small as approximately 12 inches in diameter. Nozzles mounted on the end of telescoping arms can utilize fluid jets to break up, liquefy and motivate solids.

The vertical travel robotic tank cleaning system can have up to approximately 6 degrees of freedom or more. The arm mast section rotates the mast, boom, and nozzle assemblies +/− approximately 180 degrees about the vertical longitudinal axis.

A telescoping boom allows the extension and retraction of the nozzles over approximately 30 feet to maneuver around and within the perimeter of the tank. The boom can rotate over approximately 90 degrees from vertical to horizontal.

The nozzle assembly at the distal end of the boom can be twisted and rotated to direct the liquid stream as needed. The vertical adjustability of the mast allows for the installation of longer arms into waste tanks with high waste depths.

When the vertical travel robotic tank cleaning system is initially installed in a tank with a lot of solids, the nozzle(s) first erodes material from below the arm.

As the vertical travel robotic tank cleaning system mast is incrementally lowered, more waste can be cleared from below the device. Once the vertical travel robotic tank cleaning system removes enough waste the boom and nozzle assembly can be rotated to elevate the components above the waste level. At this point, the long arm boom can be extended to be within close proximity of a large portion of the tank.

With the extended reach of the boom and the requisite nozzle orientation, great access to tank and areas shadowed by obstructions can be reached in such a way that the stream of liquefied waste can be directed towards the transfer pump. The nozzle stream can be directed into, behind, above, and below obstructions such as air lift circulators. The vertical adjustability allows the low flow high pressure orbital wash nozzles to have a closer proximity to the waste and larger effective working area by getting the nozzle closer to the work across a larger area.

The nozzle assembly can utilize a single or multiple low pressure, up to and beyond approximately 500 psi, high flow, up to approximately 500 gpm, nozzle(s), and either one, a pair or more of integrated high-pressure low flow orbital wash nozzles that provide a solid, zero-degree water fluid stream working at up to and above approximately 5,000 pounds per square inch of water pressure and flowrates up to approximately 50 gpm. The nozzle rotates the water stream in a conical pattern up to approximately 25 degrees included angle from the tip of the nozzle outlet.

The vertical travel robotic tank cleaning system is operated from a remote console station up to approximately 1000 feet away. It is hydraulically driven through a hydraulic manifold utilizing adjustable valves located directly outside the tank.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only.

A First Embodiment

B Second Embodiment

FIG. 5A illustrates a retracted (left) view of a second embodiment of the vertical travel robotic tank cleaning system.

Figures 5B, 5E:
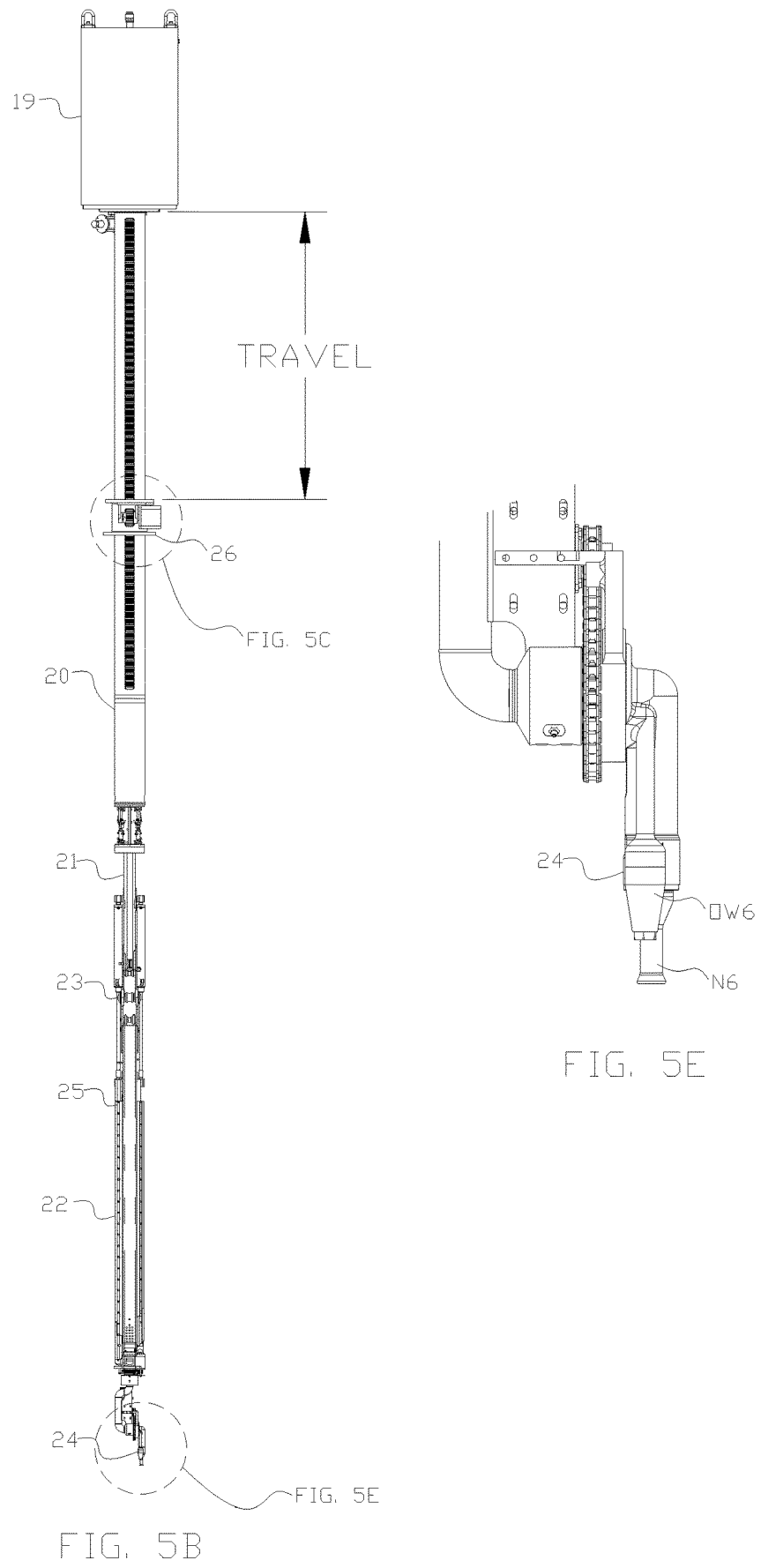

FIG. 5B illustrates an extended (right) view of the second embodiment of the vertical travel robotic tank cleaning system of FIG. 5A.

Figure 5C:
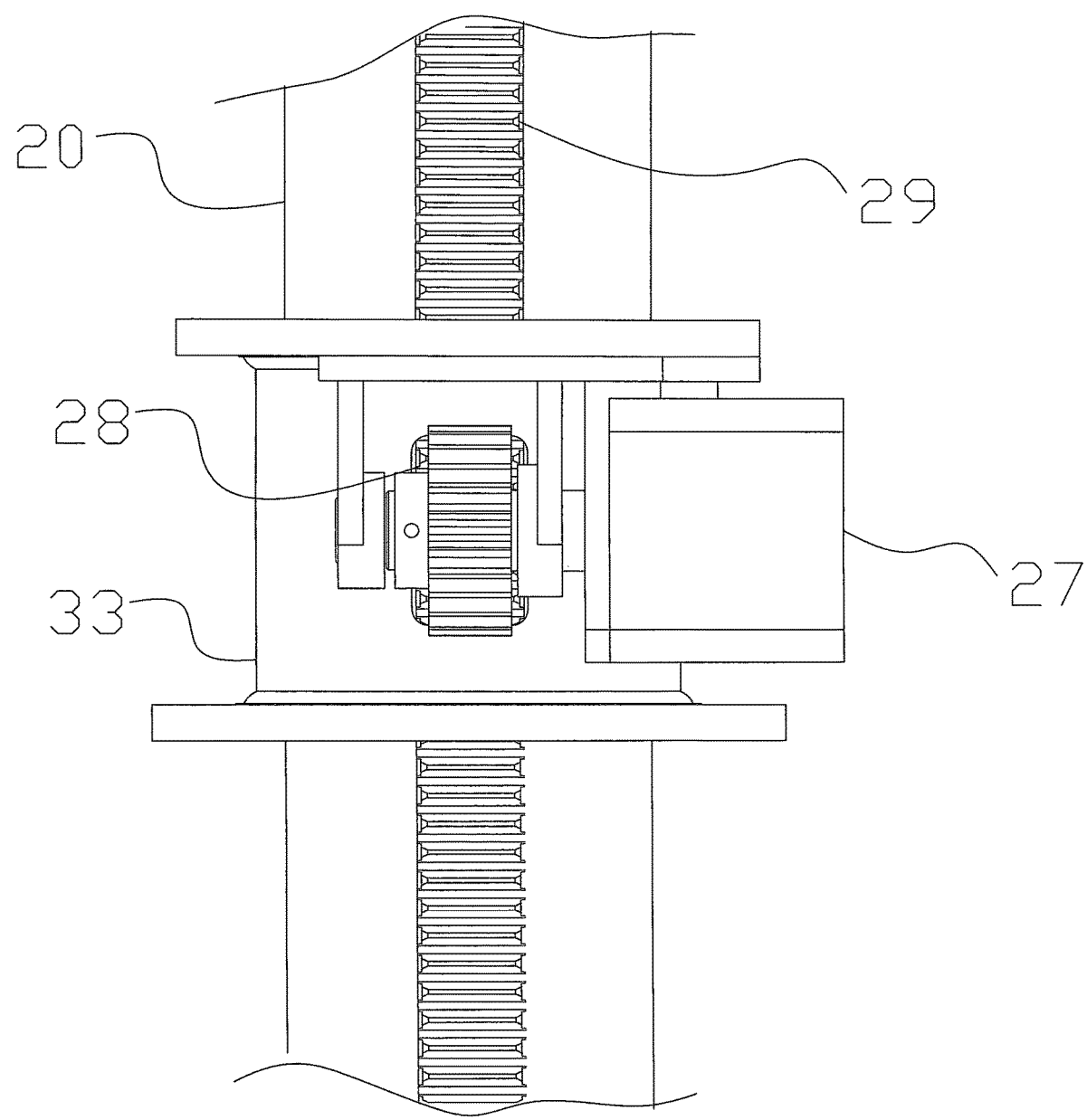

FIG. 5C is an enlarged view of a portion of the extended vertical travel robotic tank cleaning system of FIG. 5B illustrating the adapter spool with rack and pinion drive.

Figure 5D:
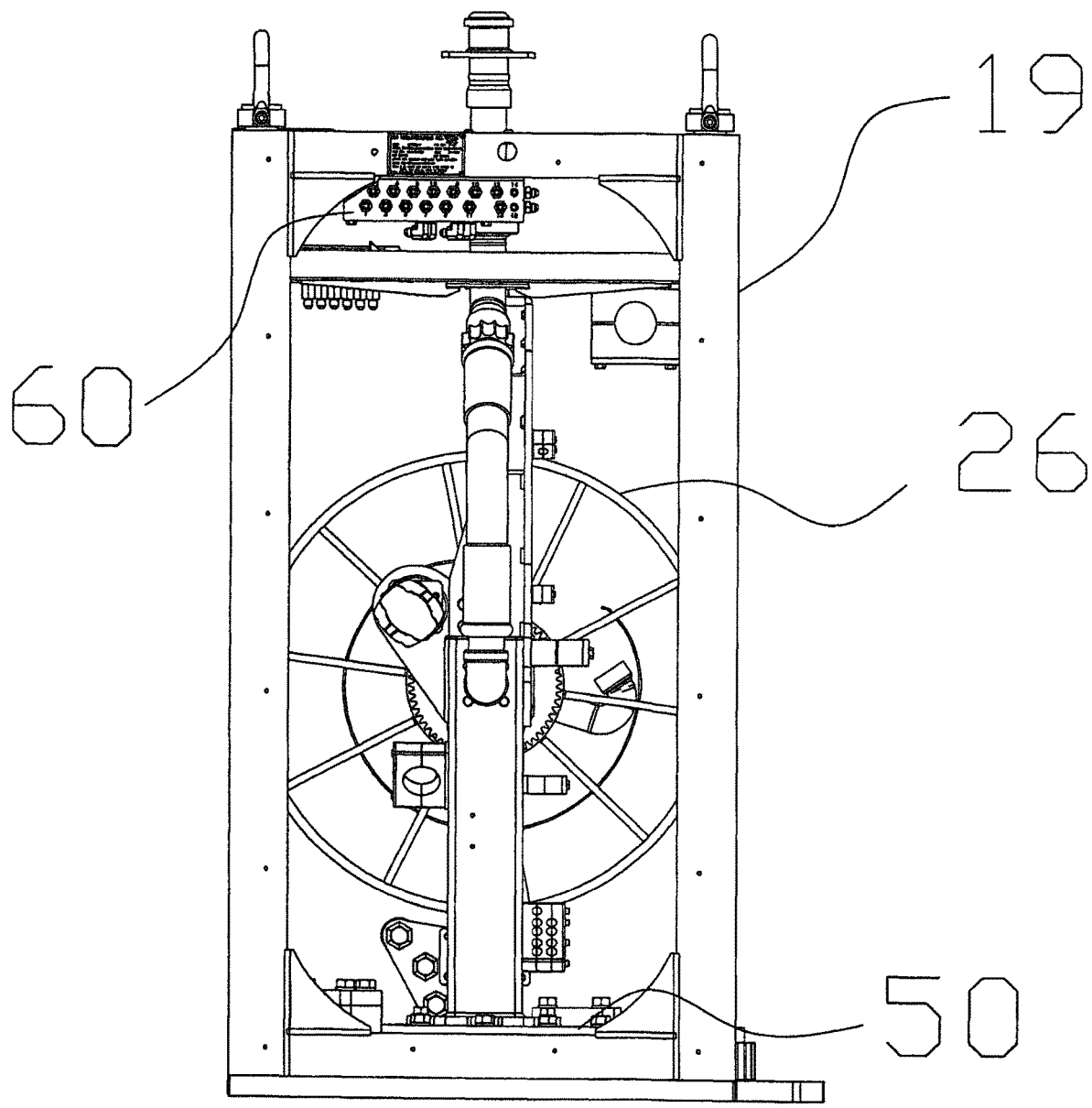

FIG. 5D is a view of the primary enclosure of FIGS. 5A-5B with the covers removed.

FIB. 5E is an enlarged view of the nozzle assembly 24 shown in FIG. B.

FIG. 5F is an enlarged view of the nozzle assembly 24 shown in FIG. 5A.

Figure 6:
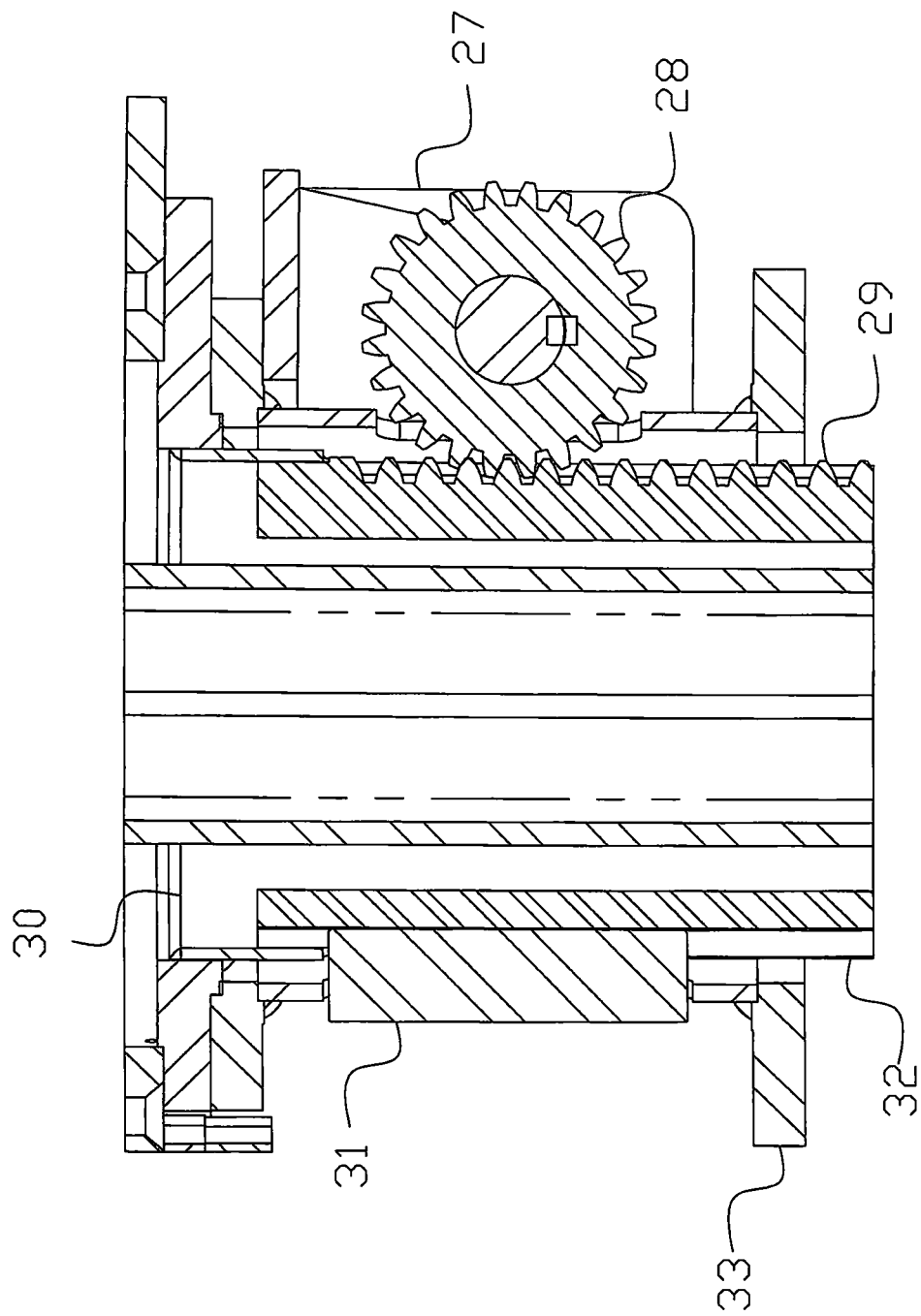

FIG. 6 illustrates a longitudinal cross section view of the adapter spool assembly of the second embodiment as FIGS. 5A-5D.

Figure 7:
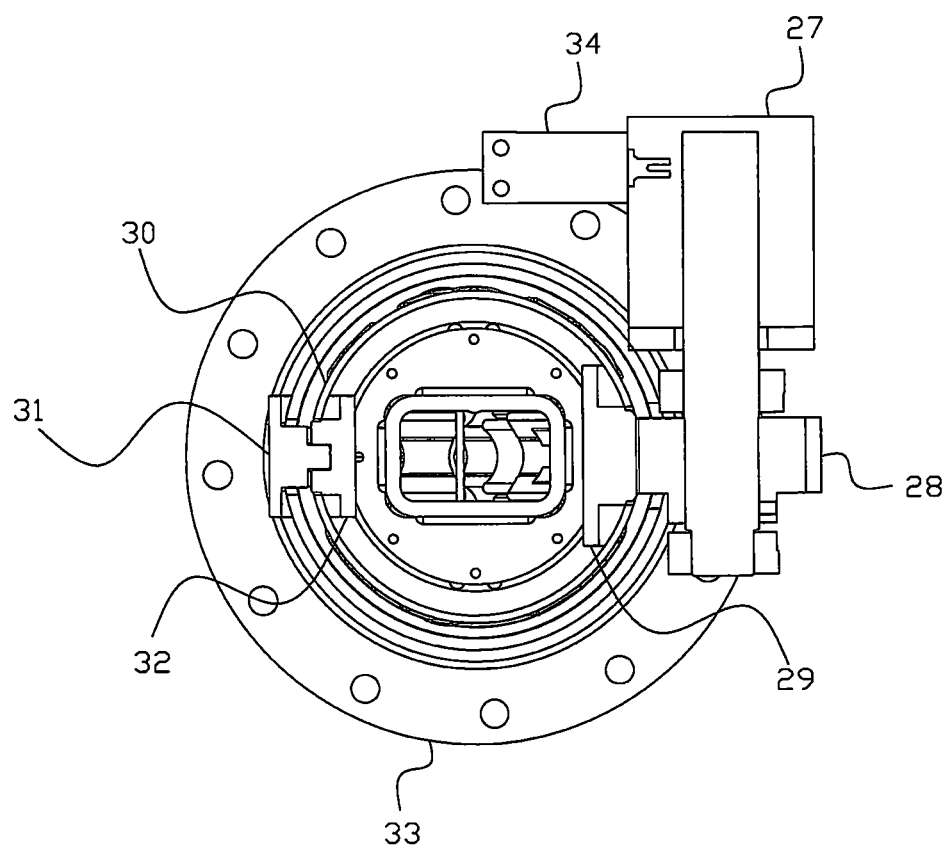

FIG. 7 illustrates a cross sectional view of the adapter spool assembly of the second embodiment as FIGS. 5A-5D.

Figure 8A:
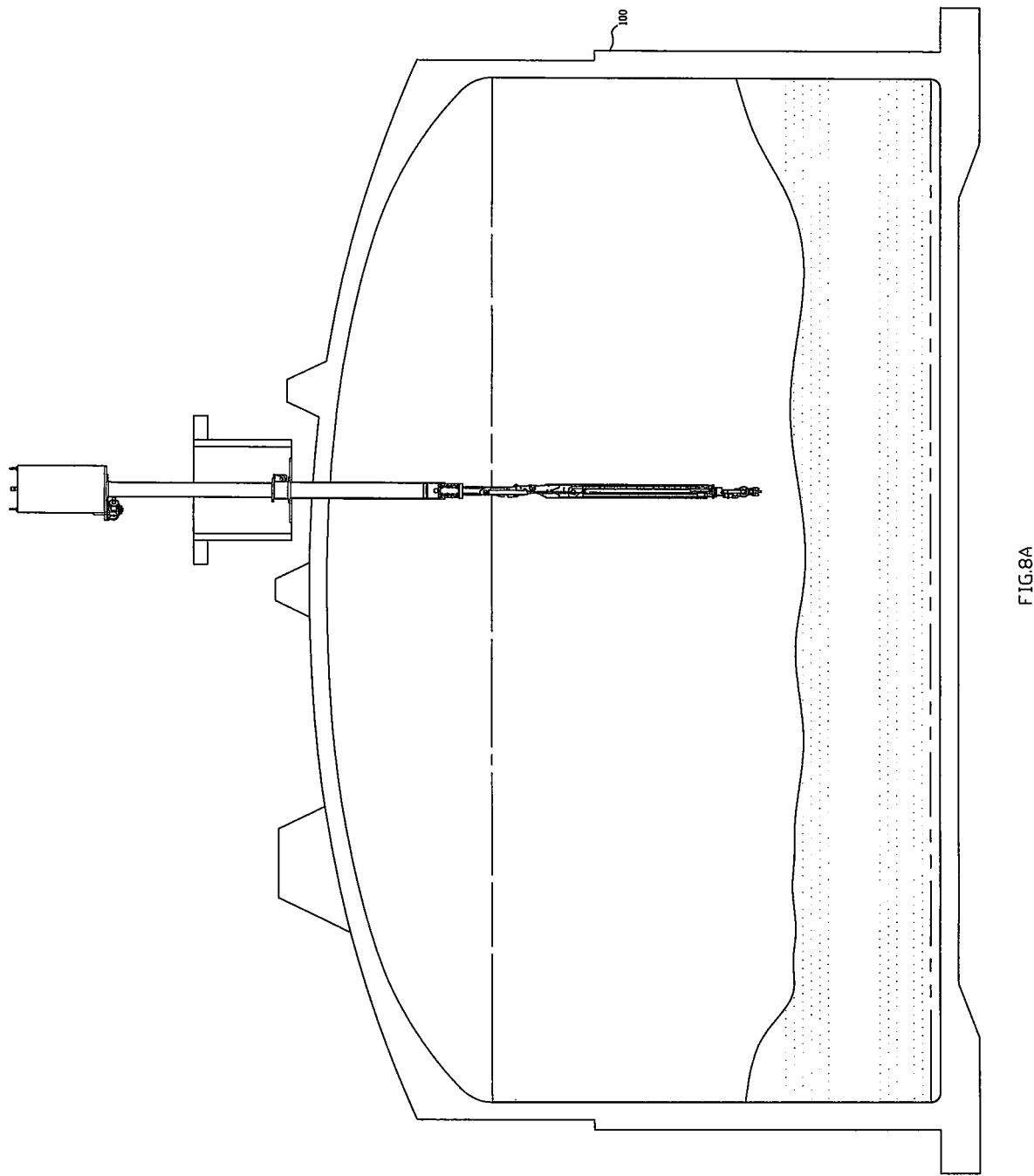

FIG. 8A illustrates a cross sectional view of a waste tank and the second embodiment as FIGS. 5A-5D installed in a typical riser and lowered to a starting position just above the waste.

Figure 8B:
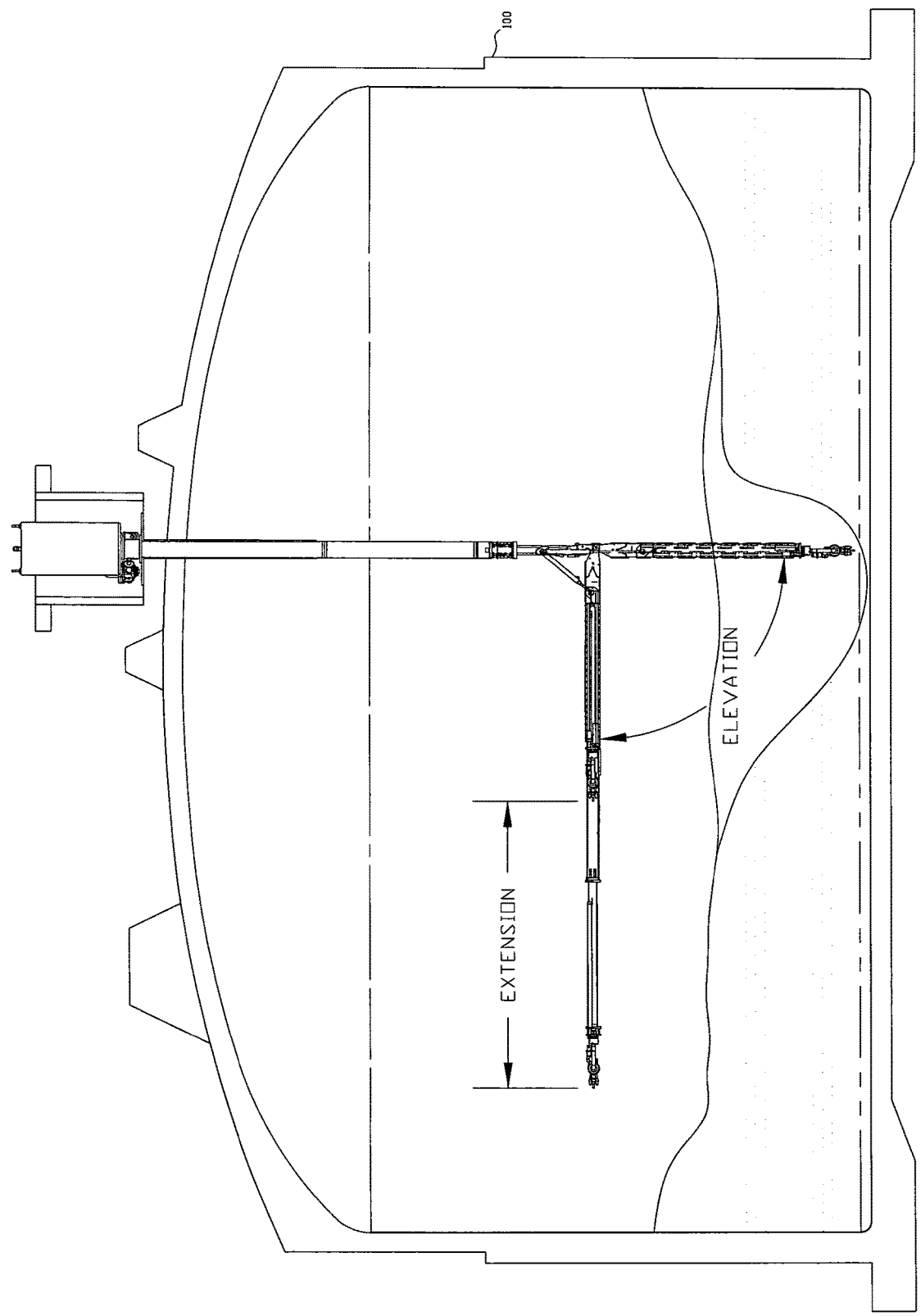

FIG. 8B illustrates a cross sectional view of a waste tank and the same embodiment as FIGS. 5A-5D is lowered and the boom pivoted into the horizontal position.

C Third Embodiment

Figure 9A:
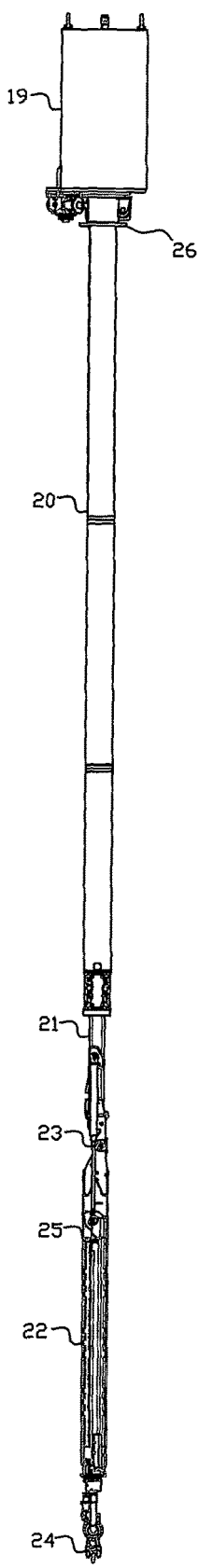

FIG. 9A illustrates a retracted (left) view of a third embodiment of the vertical travel robotic tank cleaning system.

Figure 9B:
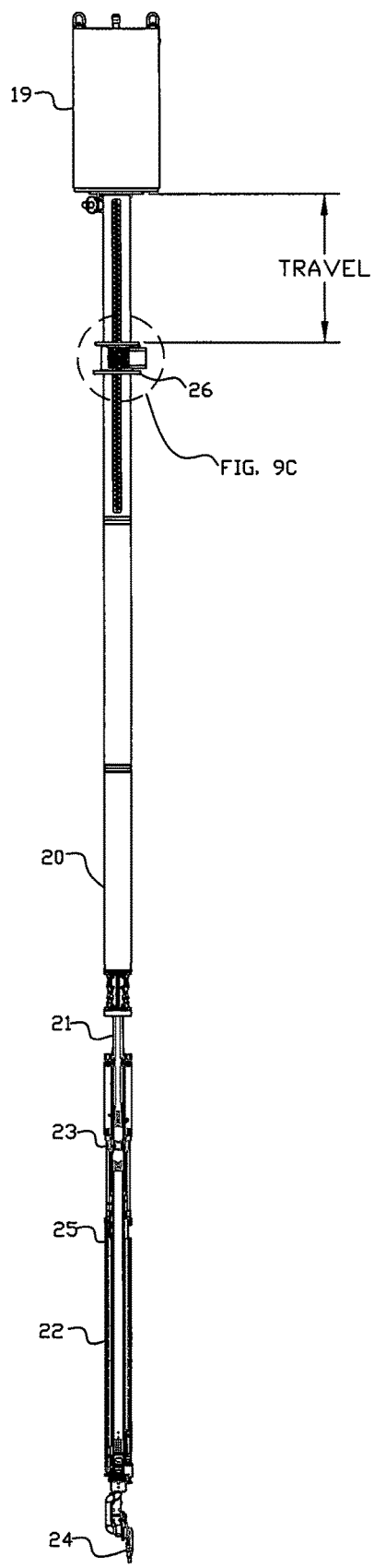

FIG. 9B illustrates an extended (right) view of the third embodiment of the vertical travel robotic tank cleaning system of FIG. 9B.

Figure 9C:
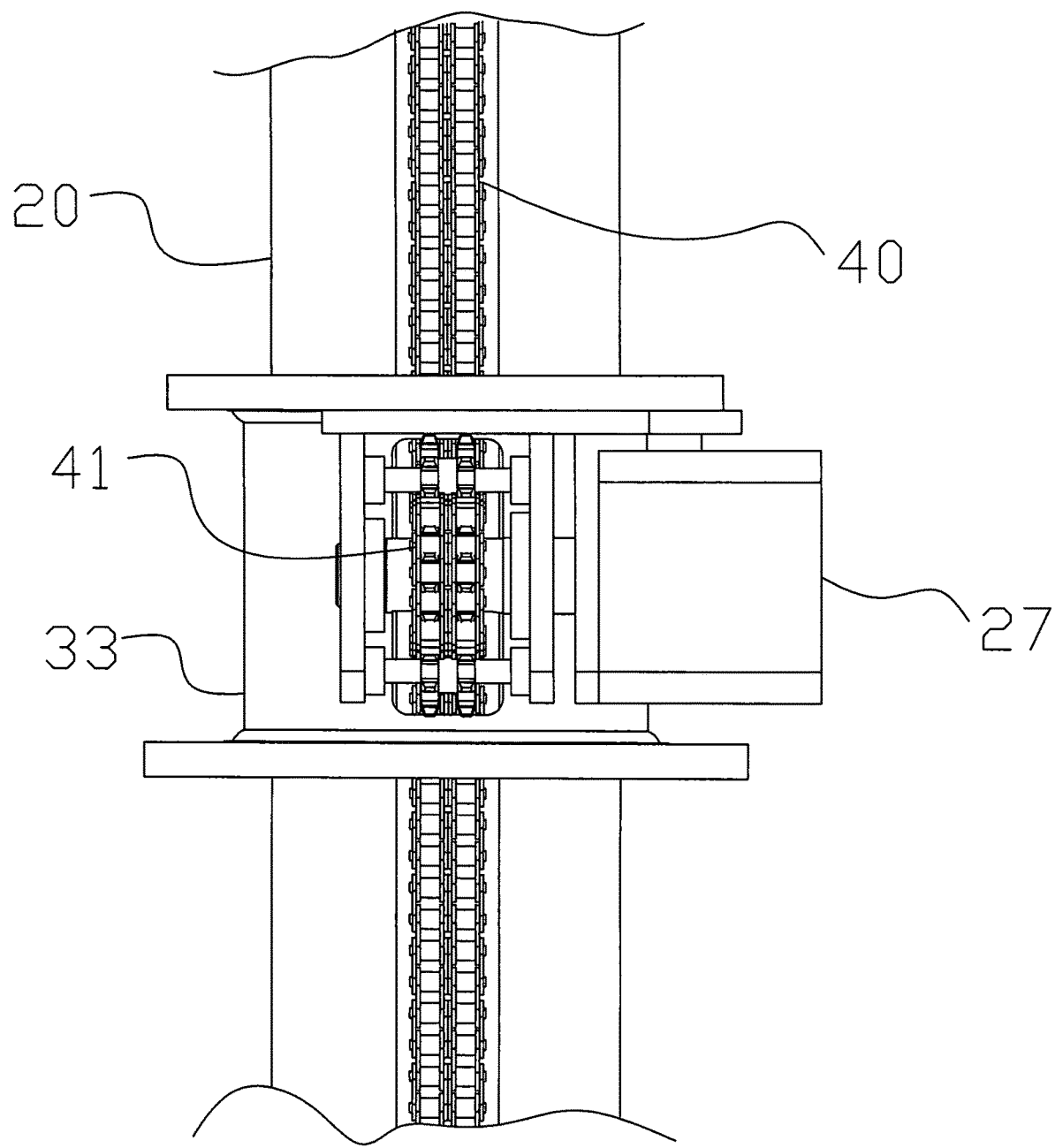

FIG. 9C is an enlarged view of a portion of the extended vertical travel robotic tank cleaning system of FIG. 9B illustrating the adapter spool with sprocket and chain drive.

Figure 10:
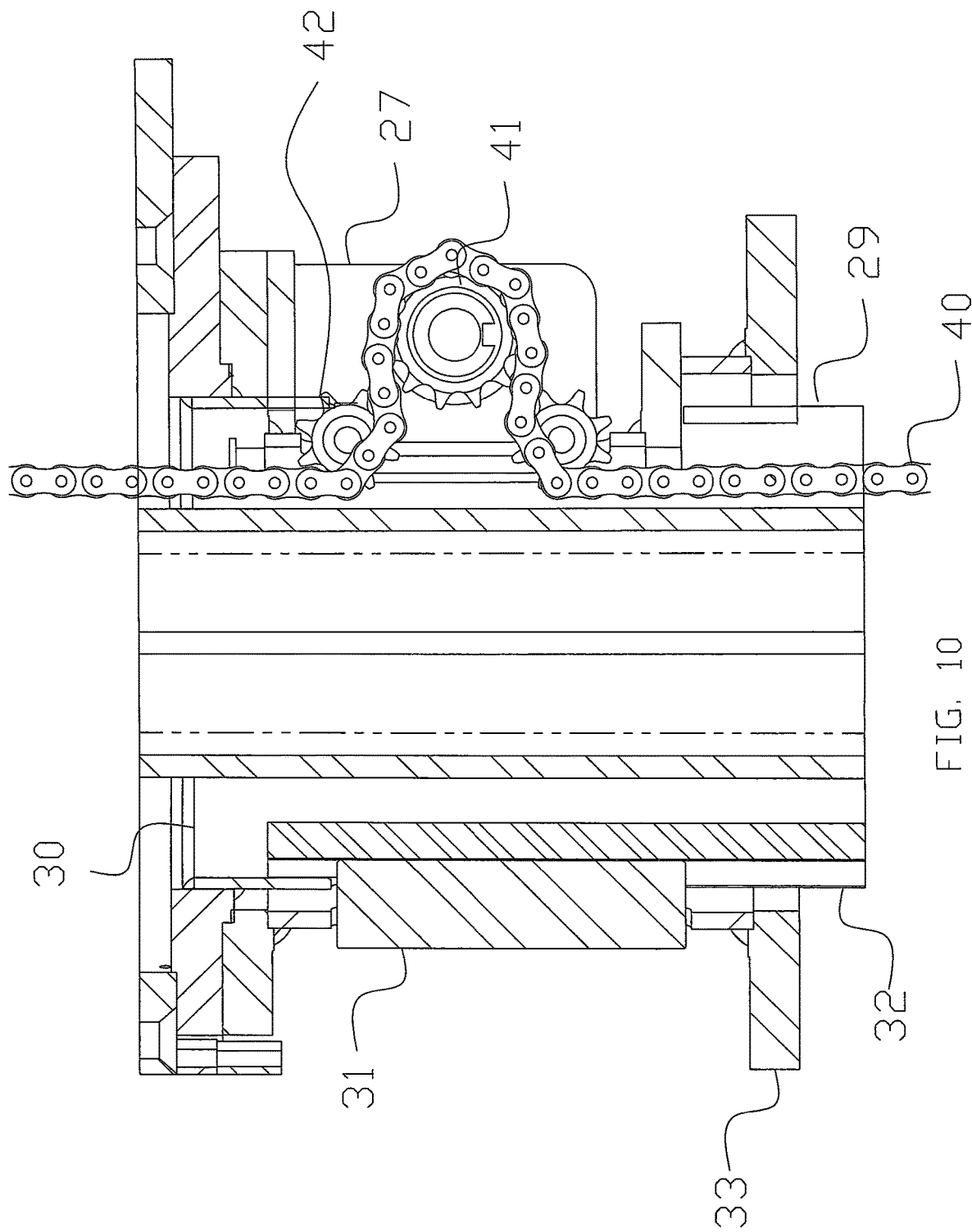

FIG. 10 illustrates a longitudinal cross section view of the adapter spool assembly of the embodiment shown in FIGS. 9A-9C.

Figure 11:
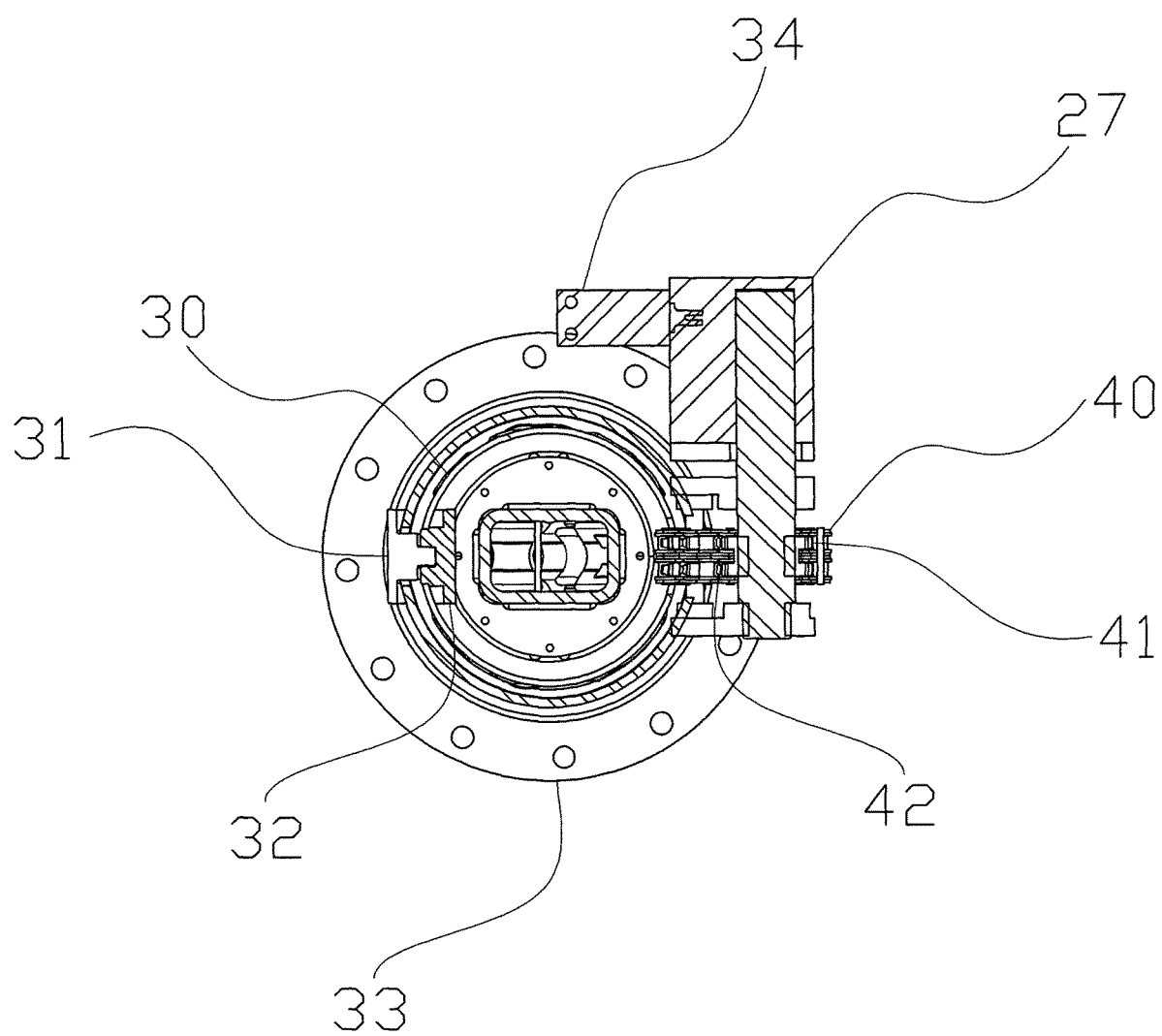

FIG. 11 illustrates a cross section view of the adapter spool assembly of the of the embodiment shown in FIGS. 9A-9C.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

A First embodiment vertical travel robotic tank cleaning system
1 primary enclosure
2 support tube
3 rectangular mast
4/22 telescopic boom section(arms)
5 pivot point
5HC boom elevation hydraulic cylinder
6 rigid nozzle assembly
N6 nozzles with pan & tilt
OWN orbital wash nozzles
6B base of nozzle assembly
6AX perpendicular axis
7 adapter spool
8 outer circular tube section
9 inner circular tube section
10 slide pads
11 outside rectangular mast tube
12 inside rectangular mast tube
13 slide pads
14 process hose
15 hydraulic cylinders
16 hydraulic hose
17 bushing/bearing
18 hose management systems
B Second embodiment vertical travel robotic tank cleaning system with rack & pinion
19 primary enclosure
20 large diameter support tube
21 rectangular mast 22 telescopic boom sections
23 pivot point
24 nozzle assembly
25 hose management system
26 hose reel/adapter spool
27 high reduction gear box
28 pinion gear
29 rack gear
30 mast support tube
31 mating key
32 key seat
33 adapter spool
34 hydraulic motor
C Third embodiment vertical travel robotic tank cleaning system with chain & sprocket(s)
40 chain
41 sprocket(s)
42 idler sprocket(s)
50 turntable
60 manifold system
70 nozzle assembly pivot motor
72 upper sprocket
74 lower sprocket
76 chain
80 nozzle assembly rotate motor
82 gears
84 nozzle assembly rotation base
86 nozzle assembly rotation stem
100 generic waste tank First Embodiment A first embodiment A, of the vertical travel robotic tank cleaning system is a hydraulically actuated, telescopic, functional in hazardous/explosive environments, able to fit through risers as small as approximately 12 inches in diameter and further extends the reach of the telescopic boom.

Figure 1A:
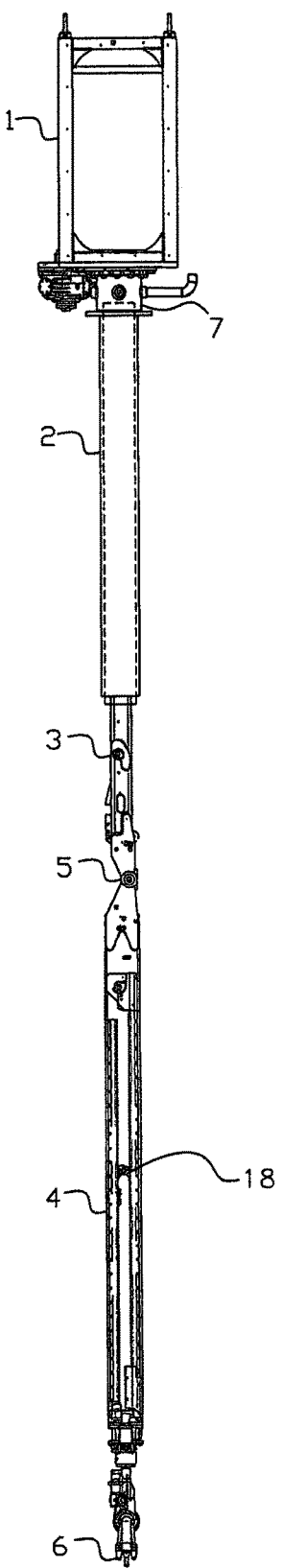
FIG. 1A shows a retracted (left) view of a first embodiment of vertical travel robotic tank cleaning system.
Figure 1B:
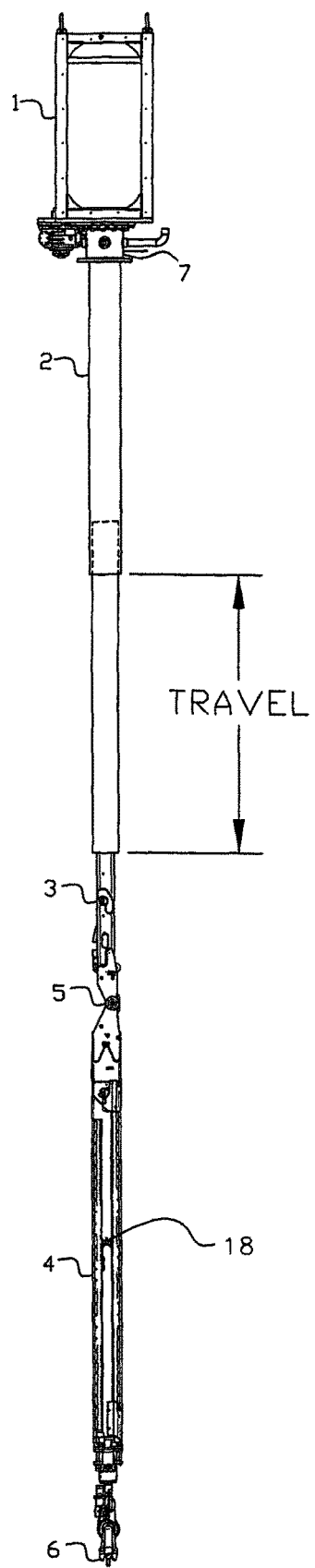
FIG. 1B shows an extended (right) view of the first embodiment of the vertical travel robotic tank cleaning system of FIG. 1A.

FIG. 1A shows a retracted (left) view of one embodiment A of the vertical travel robotic tank cleaning system. FIG. 1B shows an extended (right) view of the embodiment A of the vertical travel robotic tank cleaning system of FIG. 1A.

Figure 1C:
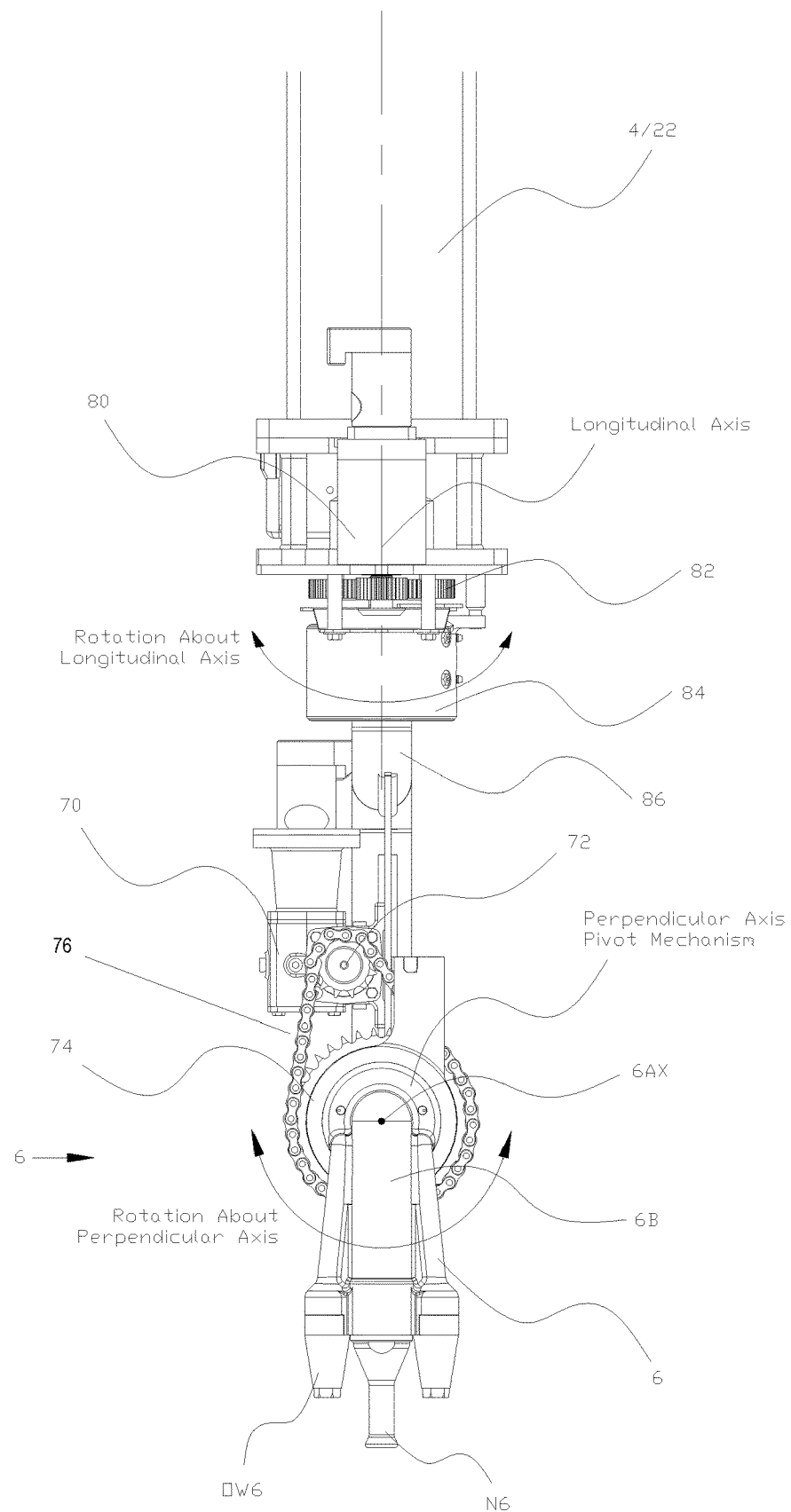
FIG. 1C is an enlarged view of the nozzle assembly shown in FIGS. 1A and 1B.

Referring to FIGS. 1A-1B and 1C, the vertical travel robotic tank cleaning system A can comprise a primary enclosure 1 that contains a turntable 50 and hose management assembly that accommodates axial and radial motion of the arm.

Extending down from the turntable assembly 50, a rectangular mast 3 can be rotated about the longitudinal axis within a large diameter support tube 2/20. Elevation of the telescopic boom sections 4 can be about the pivot point 5 with up to approximately 90 degrees of rotation to be perpendicular to mast 3.

Figure 4A:
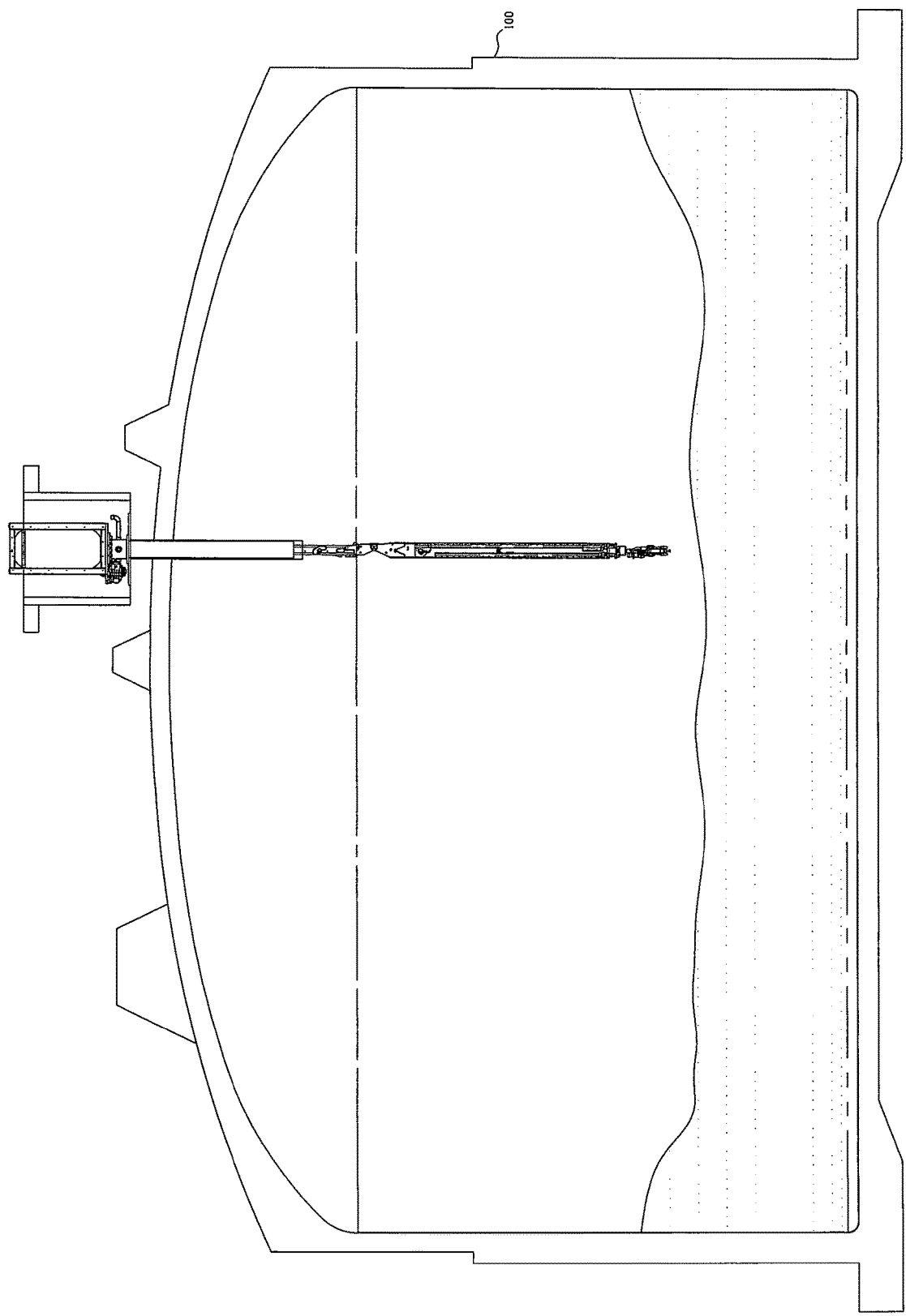
FIG. 4A illustrates a cross sectional view of the first embodiment as FIG. 1 in a waste tank.
Figure 4B:
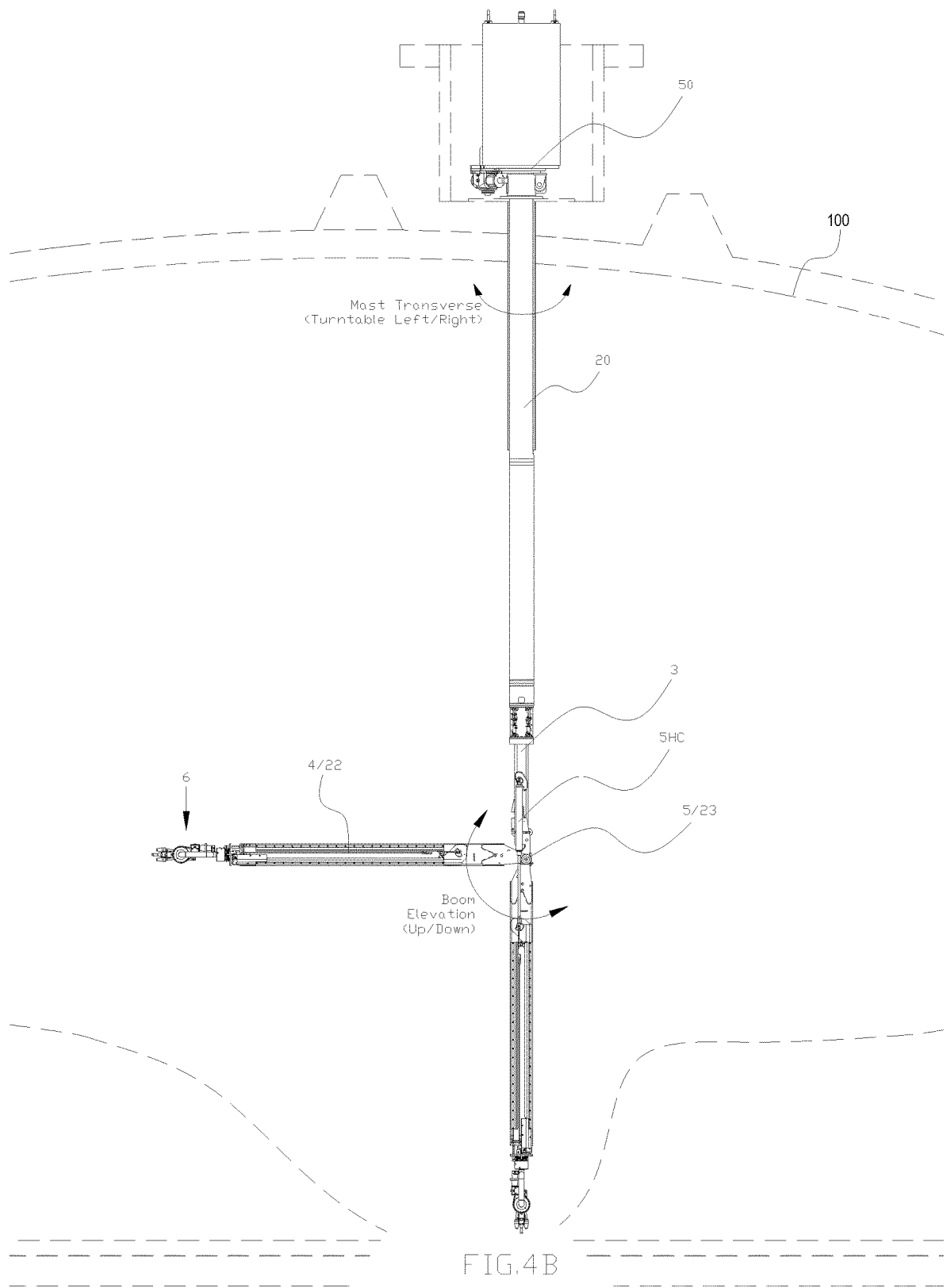
FIG. 4B illustrates a cross sectional view of the first embodiment as FIG. 1 in a vertical position and pivoted into the horizontal position all the way extended.

Referring to FIG. 4B, an inner end of telescopic boom arms 4/22 pivots to mast 3 by a pivot point 5/23 from a longitudinal position to approximately 90 degrees of rotation by an extendable and retractable boom elevation hydraulic cylinder 5HC. Turntable 50 allows for rotation of mast 3 with perpendicular boom arms 4/22.

The nozzle assembly 6, employing both low pressure, up to approximately 500 psi and high flow up to approximately 500 gpm nozzle(s) N6, as well as high pressure, low flow orbital wash nozzle(s) OW6, that provide a solid, zero-degree water fluid stream rotating in a conical pattern up to a 25 degree included angle from the tip of the nozzle outlet at pressures up to approximately 5,000 pounds per square inch of water pressure and flowrates up to approximately 50 gpm. The nozzle assembly moves through two degrees of freedom allowing it to twist about the longitudinal axis and rotate about a perpendicular axis.

Nozzle assembly 6 includes a longitudinal axis drive motor 80 which rotates gears 82 causing a rotation stem 86 extending below a rotation base 84 to rotate to twist about a longitudinal axis. A nozzle assembly pivot motor 70 with a perpendicular axis rotates an upper sprocket 72, which causes a chain 76 to rotate a lower sprocket 74, which causes a rigid base 6B of the rigid nozzle assembly 6 to pivot and rotate about a perpendicular axis.

Feeding the nozzle assembly 6 and running along the inside of the rectangular mast 3 and telescopic boom sections 4 is the process hose that leads to a hose reel in the primary enclosure 1.

A hose management system can be used to control the additional length of hydraulic hose running down the mast 3. An adapter spool 7 can support the vertical travel robotic tank cleaning system and interfaces with the tank.

Figure 2:
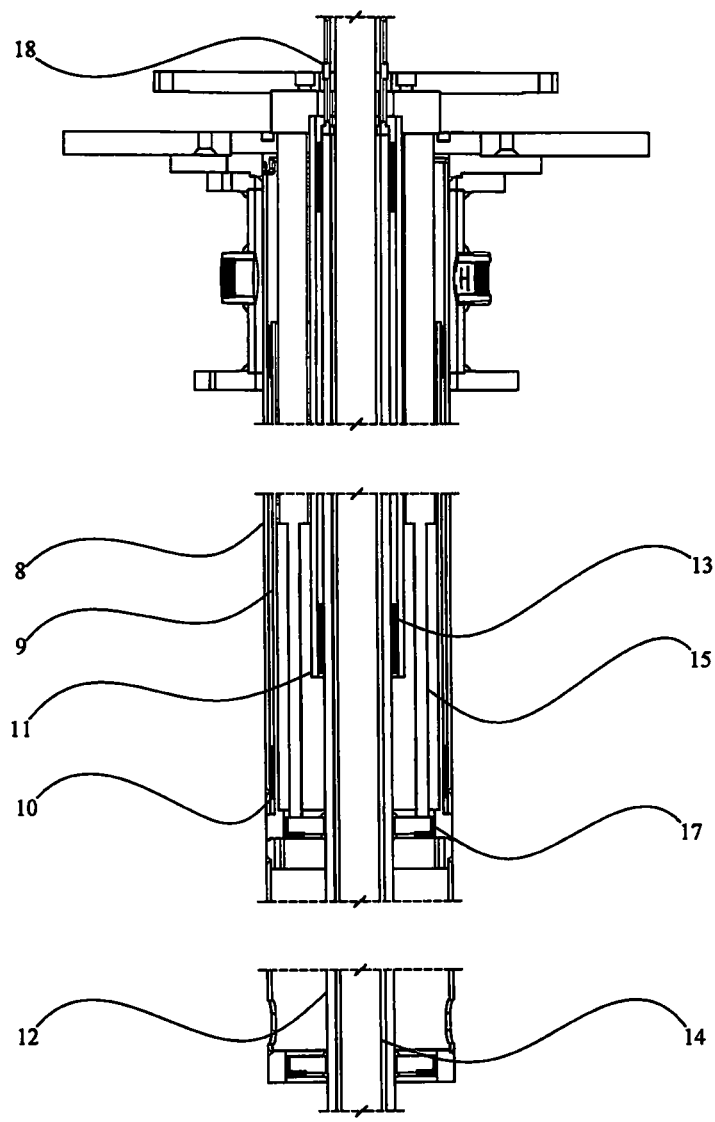
FIG. 2 illustrates a longitudinal cross section view of the first embodiment shown in FIGS. 1A and 1B.
Figure 3:
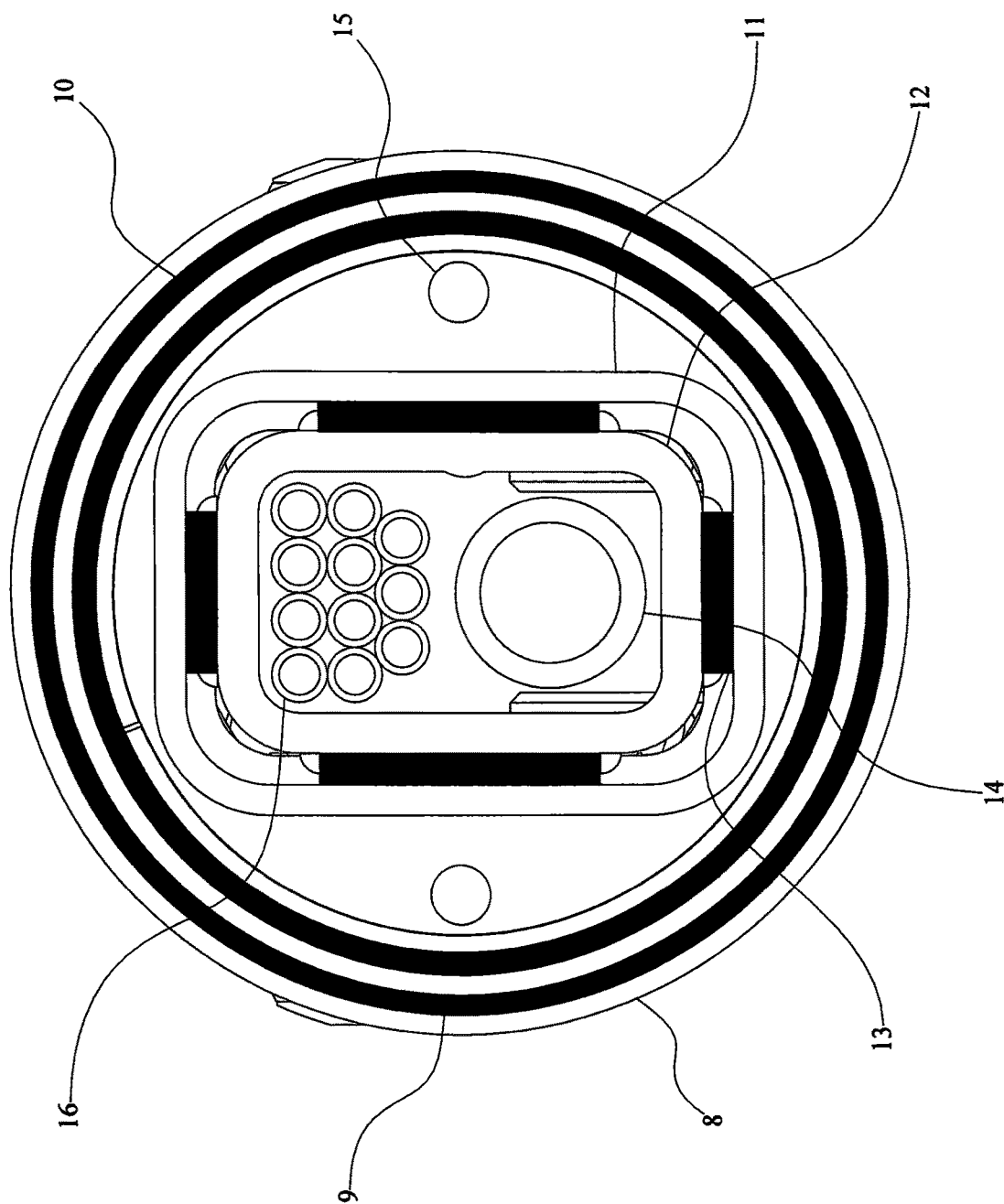
FIG. 3 illustrates a cross section view of the first embodiment as FIGS. 1A, 1B and perpendicular to FIG. 2.

FIG. 2 illustrates a longitudinal cross section view of the embodiment shown in FIGS. 1A and 1B. FIG. 3 illustrates a cross section view of the embodiment as FIGS. 1A, 1B and perpendicular to FIG. 2.

Referring to FIG. 2 and FIG. 3, this embodiment of the vertical travel robotic tank cleaning system can utilize a telescopic mast assembly and can be comprised of an outer circular tube section 8 and an inner circular tube section 9 that can slide past each other lengthwise with slide pads 10 therebetween.

A bushing or a bearing 17 cam facilitate the twisting of the mast assembly within the large diameter tubes. Along the center axis of the circular tubes can be an outside rectangular mast tube 11 and an inside rectangular mast tube 12 that slide past each other lengthwise with slide pads 13 therebetween.

Running along the inside of the inner most tube can be the process hose 14 that leads to the hose reel in the primary enclosure.

In the preferred embodiment, hydraulic cylinders 15 can be used to provide the force for extending and retracting. In a further embodiment, a rack and pinion gearset can be used to extend and retract the mast. Alternately, a chain and sprocket could be used. In an even further embodiment, a lead screw assembly could be used to extend and retract the mast. These embodiments could be hydraulic, pneumatic, or electrical motor driven. A hose management system 18 can guide the hydraulic hose 16 exiting the inner rectangular mast tube as it extends or retracts.

In reference to FIG. 4A, the vertical travel robotic tank cleaning system A of the previous FIGURES is shown retracted and installed in a generic waste tank 100 with a high waste depth.

In reference to FIG. 4B, the vertical travel robotic tank cleaning system A of the previous FIGURES is shown extended and installed in the same waste tank 100 as FIG. 4A with the waste partially eroded to allow extension and elevation.

Second Embodiment

A second embodiment of the vertical travel robotic tank cleaning system B can be hydraulically driven, utilizes a rack and pinion, functional in hazardous/explosive environments, able to fit through risers as small as approximately 12 inches in diameter and further extends the reach of the telescopic boom.

FIG. 5A illustrates a retracted (left) view of a second embodiment B of the vertical travel robotic tank cleaning system. FIG. 5B illustrates an extended (right) view of the second embodiment of the vertical travel robotic tank cleaning system B of FIG. 5A. FIG. 5C is an enlarged view of a portion of the extended vertical travel robotic tank cleaning system B of FIG. 5B illustrating the adapter spool 33 supporting a pinion gear 28 and high reduction gearbox 27 that drives a rack gear 29 mounted to the large diameter support tube 20 vertically up or down.

FIG. 5D is a view of the primary enclosure of FIGS. 1A, 1B 5A-5B with the covers removed.

Referring to FIGS. 1A, 1B, 5A, 5B, 5C, and 5D, the vertical travel robotic tank cleaning system B can comprise a primary enclosure 19 that contains a turntable and hose management assembly that accommodates axial and radial motion of the arm.

FIG. 5D shows a turntable 50 which can rotate arm 5 in FIG. 1A, 1B, and a manifold system 60 for supplying and returning working hydraulic fluid.

Extending down from the turntable assembly, a rectangular mast 21 can be rotated about the longitudinal axis within a large diameter support tube 20.

The elevation of the telescopic boom sections 22 can be about the pivot point 23 with up to approximately 90 degrees of rotation.

Referring to FIGS. 5A, 5B, 5E and 5F, the nozzle assembly 24 can employ both low pressures, up to approximately 500 psi, high flow, up to approximately 500 gpm nozzles N6, and high-pressure low flow orbital wash nozzle(s) OW6 with solid, zero-degree fluid steam(s) working at up to, above and including 5,000 pounds per square inch of water pressure, and flowrates up to approximately 50 gpm The nozzle assembly 24 moves through two degrees of freedom allowing it to twist about the longitudinal axis and rotate about a perpendicular axis.

Feeding the nozzle assembly 24, and running along the inside of the rectangular mast 21 and telescopic boom sections 22 can be the process hose that leads to a hose reel 26 in the primary enclosure 19.

Along the telescopic boom section 22, a hose management system 25 can guide and support the hydraulic hose during extension and retraction. An adapter spool 26 can be used to support and interface the vertical travel robotic tank cleaning system B to the tank 100.

FIG. 6 illustrates a longitudinal cross section view of the adapter spool assembly 33 of the second embodiment B as FIGS. 5A-5D. FIG. 7 illustrates a cross sectional view of the adapter spool assembly 33 of the second embodiment B as FIGS. 5A-5D.

Referring to FIG. 6 and FIG. 7, the vertical travel robotic tank cleaning system B can be raised and lowered through a rack gear 29 and pinion 28 gear set.

The rack gear 29 can be mounted longitudinally about the outer perimeter of the mast support tube 30. Clocked 180 degrees from the rack gear 29 is a key seat 32. The key seat 32 can be mounted longitudinally about the outer perimeter of the outermost mast support tube 30. The outer support tube 30 can fit concentrically through an adapter spool 33 with a mating key 31 to provide an anti-rotation feature. The mating key 31 is stationary and rigidly affixed to the adapter spool 33. The key has a protruding feature that is matched to the internal feature of the key seat 32, but the width is slightly undersized, ranging from approximately 0.0005" to approximately 0.0625" smaller allowing it to slide longitudinally through the stationary key seat; however, the shape of the key 31 and key seat 33 prevent rotation about the longitudinal axis.

The key 31 can be mounted longitudinally about the outer perimeter of the adapter spool 33. Also, on the adapter spool 33 can be a pinion 28 supported between two bearings and driven by a hydraulic motor 34 through a high reduction gearbox 27. Driving with the rack gear 29, the pinion rotates either clockwise or counterclockwise to raise or lower the arm.

FIG. 8A illustrates a cross sectional view of a waste tank 100 and the second embodiment B shown in FIGS. 5A-5D installed in a typical riser and lowered to a starting position just above the waste. FIG. 8B illustrates a cross sectional view of the waste tank 100 as the second embodiment B of FIGS. 5A-5D is lowered and the boom pivoted into the horizontal position.

Referring to FIG. 8A, the multi axis distal nozzle cleaning arm B is shown retracted and installed in a generic waste tank 100 with a high waste depth.

Referring to FIG. 8B, the multi axis distal nozzle cleaning arm B is shown extended and installed in the same waste tank 100 as FIG. 8A with the waste partially eroded to allow extension and elevation.

Third Embodiment

FIG. 9A illustrates a retracted (left) view of a third embodiment C of the vertical travel robotic tank cleaning system. FIG. 9B illustrates an extended (right) view of the third embodiment C of the vertical travel robotic tank cleaning system of FIG. 9B.

FIG. 9C is an enlarged view of a portion of the extended vertical travel robotic tank cleaning system of FIG. 9B illustrating the adapter spool 33 supporting a sprocket 41 and high reduction gearbox 27 that drives a chain 40 affixed to the large diameter support tube 20 vertically up or down.

A third embodiment of the vertical travel robotic tank cleaning system C can be hydraulically driven, utilizes a chain and sprocket, functional in hazardous/explosive environments, able to fit through risers as small as 12 inches in diameter and further extends the reach of the telescopic boom.

Referring to FIGS. 9A, 9B and 9C, the vertical travel robotic tank cleaning system C can include a primary enclosure 19 that contains a turntable and hose management assembly that accommodates axial and radial motion of the arm.

Extending down from the turntable assembly, a rectangular mast 21 can be rotated about the longitudinal axis within a large diameter support tube 20. Elevation of the telescopic boom sections 22 can be about the pivot point 23 with up to approximately 90 degrees of rotation.

The nozzle assembly 24, employing both low pressure, up to approximately 500 psi, high flow, up to approximately 500 gpm, and high pressure low flow nozzle(s) orbital wash nozzle(s) that provide a solid, zero-degree water fluid stream rotating in a conical pattern up to a 25 degree included angle from the tip of the nozzle outlet at pressures up to, above and including 5,000 pounds per square inch of water pressure and flowrates up to approximately 50 gpm. The nozzle assembly moves through approximately two degrees of freedom allowing it to twist about the longitudinal axis and rotate about a perpendicular axis. Feeding the nozzle assembly 24, and running along the inside of the rectangular mast 21 and telescopic boom sections 22 can be the process hose that leads to a hose reel 26 in the primary enclosure 19.

Along the telescopic boom section 22, a hose management system 25 guides and supports the hydraulic hose during extension and retraction. The adapter spool 26 supports and interfaces the vertical travel robotic tank cleaning system to the tank 100 (shown in previous FIGURES.

FIG. 10 illustrates a longitudinal cross section view of the adapter spool assembly 33 of the embodiment C shown in FIGS. 9A-9C. FIG. 11 illustrates a cross section view of the adapter spool assembly 33 of the of the embodiment C shown in FIGS. 9A-9C.

Referring to FIG. 10 and FIG. 11, the vertical travel robotic tank cleaning system C can be raised and lowered through a chain 40 and driven sprocket 41 set. The chain 40 can be mounted longitudinally about the outer perimeter of the mast support tube 30. Clocked approximately 180 degrees from the chain 40 can be a key seat 32. The key seat 32 can be mounted longitudinally about the outer perimeter of the outermost mast support tube 30. The outer support tube 30 fits concentrically through an adapter spool 33 with a mating key 31 to provide an anti-rotation feature. The key 31 can be mounted longitudinally about the outer perimeter of the adapter spool 33. The mating key 31 is stationary and rigidly affixed to the adapter spool 33. The key has a protruding feature that is matched to the internal feature of the key seat 32, but the width is slightly undersized, ranging from approximately 0.0005" to approximately 0.0625" smaller allowing it to slide longitudinally through the stationary key seat; however, the shape of the key 31 and key seat 33 prevent rotation about the longitudinal axis.

Also, on the adapter spool 33 can be a sprocket 41 supported between two bearings and driven by a hydraulic motor 34 through a high reduction gearbox 27. Driving the chain 40, the sprocket 41 rotates either clockwise or counterclockwise to raise or lower the arm. On each side of the driven sprocket can be idler sprockets 42.

The systems, devices and methods can be remotely and robotically controlled with an interface which can allow a remotely located human operator to monitor and manipulate the process in real-time using controls such as but not limited to joysticks, and the like, as described in U.S. patent application Ser. No. 15/854,424 filed Dec. 26, 2017 entitled: Articulating Arm Programmable Tank Cleaning Nozzle, to the same assignee as the subject patent application, and which is incorporated by reference in its' entirety.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A vertical travel robotic tank cleaning system for cleaning tanks, comprising:
    a mast assembly that mounts to a riser structure, the mast assembly comprising a vertically adjustable mast that includes a telescopic assembly comprised of an outer circular tube section and an inner circular tube section that can slide past each other lengthwise with slide pads therebetween;
    a telescopic boom attached to the mast assembly;
    a turntable connected to the mast assembly that rotates the telescopic boom;
    a hose management system that accommodates axial and radial motion of the telescopic boom;
    a nozzle assembly on an end of the telescopic boom, the nozzle assembly includes a plurality of nozzles attached together as a rigid unit on a distal end of the telescopic boom with pan and tilt capability, the plurality of nozzles comprises one low pressure and high flow nozzle between a pair of orbital wash nozzles, each nozzle in the nozzle assembly includes a center line axis which are substantially parallel with each other, the one low pressure and high flow nozzle provides a spray up to approximately 500 psi (pounds per square inch) and up to approximately 500 gpm (gallons per minute), the orbital wash nozzles each provides a solid, zero-degree water fluid stream rotating in a conical pattern up to 5,000 psi (pounds per square inch) and up to approximately 50 gpm (gallons per minute); and
    a manifold system for supplying and returning working hydraulic fluid.

2. The vertical travel robotic tank cleaning system of claim 1, wherein the mast assembly includes a maximum body diameter that allows installation through a hole as small as 12 inches in diameter.

3. The vertical travel robotic tank cleaning system of claim 1, further comprising:
    a plurality of hydraulically actuated cylinders and motors allowing operation of the system in hazardous and explosive environments.

4. The vertical travel robotic tank cleaning system of claim 1, wherein the telescopic boom rotates approximately 180 degrees relative to a vertical axis in either direction.

5. The vertical travel robotic tank cleaning system of claim 1, wherein the telescopic boom pivots approximately 90 degrees from vertical to horizontal and extends and retracts approximately 30 feet to allow the nozzle assembly to maneuver around the perimeter of a tank.

6. The vertical travel robotic tank cleaning system of claim 1, further comprising:
    a nickel plating to counteract corrosive environments.

7. The vertical travel robotic tank cleaning system of claim 1, wherein the nozzle assembly at an outer end of the telescopic boom moves through two degrees of freedom for allowing twist over a longitudinal axis and rotation about a perpendicular axis.

8. The vertical travel robotic tank cleaning system of claim 1, wherein the telescopic boom is extendable and retractable to allow the nozzle assembly an extended reach to allow each nozzle to move closer to a work surface over a larger area.

9. The vertical travel robotic tank cleaning system of claim 1, wherein the telescopic boom pivots approximately 90 degrees from vertical to horizontal, and the boom extends and retracts to allow the nozzle assembly to maneuver around the perimeter of a tank, and the mast twists by the turntable causing the boom to rotate circumferentially about the perimeter of the tank.

10. The vertical travel robotic tank cleaning system of claim 9, wherein the nozzle assembly pivots and twists relative to the telescopic boom.

11. The vertical travel robotic tank cleaning system of claim 1, wherein the nozzle assembly pivots and twists relative to the telescopic boom.

12. A vertical travel robotic tank cleaning system for cleaning tanks, comprising:
- a mast assembly that mounts to a riser structure, the mast assembly comprising a vertically adjustable mast that includes a telescopic assembly comprised of an outer circular tube section and an inner circular tube section that can slide past each other lengthwise with slide pads therebetween;
- a telescopic boom attached the mast assembly;
- a turntable connected to the mast assembly that rotates the telescopic boom;
- a hose management system that accommodates axial and radial motion of the telescopic boom;
- a nozzle assembly on an end of the telescopic boom, the nozzle assembly includes a plurality of nozzles rigidly attached on a distal end of the telescopic boom with pan and tilt capability, the plurality of nozzles comprises one low pressure and high flow nozzle between a pair of orbital wash nozzles, each nozzle in the nozzle assembly includes a center line axis which are substantially parallel with each other; and
- a manifold system for supplying and returning working hydraulic fluid.

13. The system of claim 12, wherein the at least one low pressure and high flow nozzle provides a spray up to approximately 500 psi (pounds per square inch) and up to approximately 500 gpm (gallons per minute).

14. The system of claim 12, wherein each orbital wash nozzle provides a solid, zero-degree water fluid stream rotating in a conical pattern up to 5,000 psi (pounds per square inch) and up to approximately 50 gpm (gallons per minute).

15. The system of claim 12, wherein the telescopic boom pivots approximately 90 degrees from vertical to horizontal and extends and retracts approximately 30 feet to allow the nozzle assembly to maneuver around the perimeter of a tank.

16. The system of claim 12, wherein the nozzle assembly that includes the plurality of nozzles attached together as the rigid unit at an outer end of the telescopic boom moves through two degrees of freedom for allowing twist over a longitudinal axis and rotation about a perpendicular axis.

17. The vertical travel robotic tank cleaning system of claim 12, wherein the telescopic boom pivots approximately 90 degrees from vertical to horizontal and the boom extends and retracts to allow the nozzle assembly to maneuver around the perimeter of a tank, and the mast twists by the turntable causing the telescopic boom to rotate circumferentially about the perimeter of the tank.

18. The vertical travel robotic tank cleaning system of claim 17, wherein the nozzle assembly pivots and twists relative to the boom.

19. The vertical travel robotic tank cleaning system of claim 12, wherein the nozzle assembly pivots and twists relative to the telescopic boom.

20. A vertical travel robotic tank cleaning system for cleaning tanks, comprising:
- a mast assembly that mounts to a riser structure, the mast assembly comprising a vertically adjustable mast that includes a telescopic assembly comprised of telescopic tubes;
- a telescopic boom attached to the mast assembly by a pivot point, the telescoping boom pivots approximately 90 degrees from vertical to horizontal;
- a turntable connected to the mast assembly that rotates the telescopic boom, wherein the telescopic boom rotates and pivots relative to the riser structure; and
- a nozzle assembly attached by attach components to an outer end of the telescopic boom, the nozzle assembly includes a rigid unit comprising one low pressure and high flow nozzle between a pair of orbital wash nozzles, each nozzle in the nozzle assembly includes a center line axis which are substantially parallel with each other, the attach components allows the nozzle assembly move through two degrees of freedom to twist over a longitudinal axis and rotation about a perpendicular axis, relative to the outer end of the telescoping boom.

\* \* \* \* \*